(12) United States Patent
Telep et al.

(10) Patent No.: US 8,074,622 B2
(45) Date of Patent: Dec. 13, 2011

(54) CONTROL AND INTERCONNECTION SYSTEM FOR AN APPARATUS

(75) Inventors: Robert J. Telep, Livonia, MI (US); Robert D. Keefover, Lake Orion, MI (US); Murray F. Busato, Clinton Township, MI (US); Donald Podwoiski, Garden City, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 1696 days.

(21) Appl. No.: 11/335,118

(22) Filed: Jan. 19, 2006

(65) Prior Publication Data

US 2006/0166519 A1 Jul. 27, 2006

Related U.S. Application Data

(60) Provisional application No. 60/646,919, filed on Jan. 25, 2005.

(51) Int. Cl.
*F02D 11/10* (2006.01)
(52) U.S. Cl. ........................................ 123/399
(58) Field of Classification Search .................. 123/399
See application file for complete search history.

(56) References Cited

U.S. PATENT DOCUMENTS

| | | |
|---|---|---|
| 4,910,420 A | 3/1990 | Hoover et al. |
| 5,344,794 A | 9/1994 | Whitney et al. |
| 5,445,974 A | 8/1995 | Whitney |
| 5,506,425 A | 4/1996 | Whitney et al. |
| 5,723,363 A | 3/1998 | Wiese |
| 5,831,369 A | 11/1998 | Furbacher et al. |
| 5,919,843 A | 7/1999 | von Gentzkow et al. |
| 5,932,942 A | 8/1999 | Patyk et al. |
| 6,036,173 A | 3/2000 | Neu et al. |
| 6,058,020 A | 5/2000 | Winterer et al. |
| 6,098,459 A | 8/2000 | Bauer |
| 6,160,708 A | 12/2000 | Loibl et al. |
| 6,177,740 B1 | 1/2001 | Burns |
| 6,432,745 B1 | 8/2002 | Waitl et al. |
| 6,486,764 B2 | 11/2002 | Byram |
| 6,538,429 B2 | 3/2003 | Schroeder et al. |
| 6,628,491 B1 | 9/2003 | Tihanyi et al. |
| 6,716,673 B2 | 4/2004 | Waitl et al. |
| 6,776,058 B1 | 8/2004 | Schroeder |
| 6,776,634 B2 | 8/2004 | Besier et al. |

(Continued)

FOREIGN PATENT DOCUMENTS

DE 102 28 689 A1 1/2004

(Continued)

*Primary Examiner* — Elvin G Enad
*Assistant Examiner* — Alexander Talpalatskiy
(74) *Attorney, Agent, or Firm* — Warn Partners, P.C.

(57) ABSTRACT

Many devices, such as a turbocharger, use an apparatus to control their functions. For example, pneumatic and electric actuators are used to provide positional control of a mechanism on the turbocharger. The actuator must connect to the vehicles electrical system to provide suitable communication and control of the actuator. They must also have internal control and interconnection of devices such as sensors, electronic control unit, external electrical connector, and internal electrical connections. The electrical connections, placement of sensor, and placement of the controller are critical to the performance, reliability, and cost of the actuator. The control and interconnection system will provide the aforementioned requirements including a "quick connect" capability for electrical connections and ease of assembly.

11 Claims, 8 Drawing Sheets

U.S. PATENT DOCUMENTS

| | | |
|---|---|---|
| 2002/0184759 A1 | 12/2002 | Wimmer |
| 2003/0024505 A1* | 2/2003 | Anschicks et al. ............ 123/399 |
| 2003/0178004 A1* | 9/2003 | Keefover et al. ............. 123/399 |
| 2004/0129909 A1 | 7/2004 | Wiese |
| 2004/0155644 A1 | 8/2004 | Stauth et al. |
| 2004/0187495 A1* | 9/2004 | Ando et al. .................... 60/602 |
| 2004/0231644 A1* | 11/2004 | Ikeda et al. ................... 123/399 |
| 2005/0109315 A1 | 5/2005 | Kamimura et al. |

FOREIGN PATENT DOCUMENTS

| | | |
|---|---|---|
| EP | 1 167 724 A1 | 1/2002 |
| EP | 1 217 192 A2 | 6/2002 |
| EP | 1 281 849 A2 | 2/2003 |
| EP | 1 349 259 A2 | 10/2003 |
| EP | 1 450 020 A2 | 8/2004 |
| EP | 1 515 024 A2 | 3/2005 |

* cited by examiner

US 8,074,622 B2

CONTROL AND INTERCONNECTION SYSTEM FOR AN APPARATUS

CROSS-REFERENCE TO RELATED APPLICATIONS

This application claims the benefit of U.S. Provisional Application No. 60/646,919, filed Jan. 25, 2005. The disclosure of which is incorporated herein by reference.

FIELD OF THE INVENTION

The present invention relates to a control and interconnection assembly for providing an actuator with power supply and position sensors.

BACKGROUND OF THE INVENTION

Many devices, such as a turbocharger, use an apparatus to control their functions. For example, pneumatic and electric actuators are used to provide positional control of mechanisms on the turbocharger to adjust and maintain the pressure within the intake manifold of an engine.

FIG. 1 shows a schematic of a system using a turbocharger and an actuator to control boost pressure within the intake manifold 8 of engine 9. The system consists of the vehicle's electronic control unit (ECU) 1, actuator controller 2, actuator 3, turbocharger 4 and turbocharger control mechanism 5. The ECU is connected to the actuator controller by a wire harness 6 having multiple conductors and connectors. The actuator controller is also connected to the actuator by a wire harness 7 having multiple conductors and connectors.

The ECU 1 will provide an electrical signal to the actuator controller 2 that will indicate a desired position of actuator 3. The actuator controller will provide the necessary electrical control to the actuator. The actuator will move the control mechanism 5 of turbocharger 4, to the desired position that will achieve a desired pressure within the intake manifold 8 of engine 9. Actuator 3 also has a means of sensing its position and will feedback this signal to the actuator controller 2. A "closed loop" control scheme is used to maintain a desired actuator position by comparing the feedback value to a desired value and adjusting the control signal, to the actuator, to maintain the position and resulting boost pressure. Other signals, such as an intake manifold pressure-sensing signal may also be monitored, by ECU 1 or actuator controller 2, and used in the "closed loop" scheme to control the intake manifold pressure. The actuator controller can also monitor the performance of the actuator and provide feedback to the ECU. For example, items such as internal actuator temperature, voltage, current, actuator resistance, response time, and number of occurrences of a fault can be monitored and communicated to another system such as the vehicle ECU. Monitoring of some items may be a legislated requirement.

The electric actuator may use a D.C. motor as a means of actuation. The motor may use brushes for commutating its rotating member or it may be a brushless type motor. The brushless motor uses a number of magnetic sensors and an electrical control circuit to commutate its rotor and control its rotation. Magnetic devices, such as Hall effect devices (HED), are commonly used. The HED sensors must be in proximity to the motor's rotor and stator to effectively sense the magnetic field and provide a signal to a control circuit. The brushless motor also has a number of coils, wound with magnet wire, which must be connected to the control circuit. This type of actuator requires a number of electrical connections in addition to the accurate placement of the sensors. Control and connection methods such as separate control circuits may be difficult to assemble, costly, and undesirable. In addition, the motor, HED sensors, and control circuit may not be in one location. For example, the motor and hall sensors may be located in the actuator housing and the control circuit may be in the cover of the housing. This could require a complex interconnection system needing a multiple wire cable that may have durability and reliability issues. The following paragraphs will describe a system that will provide the required control and minimize components and interconnections.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
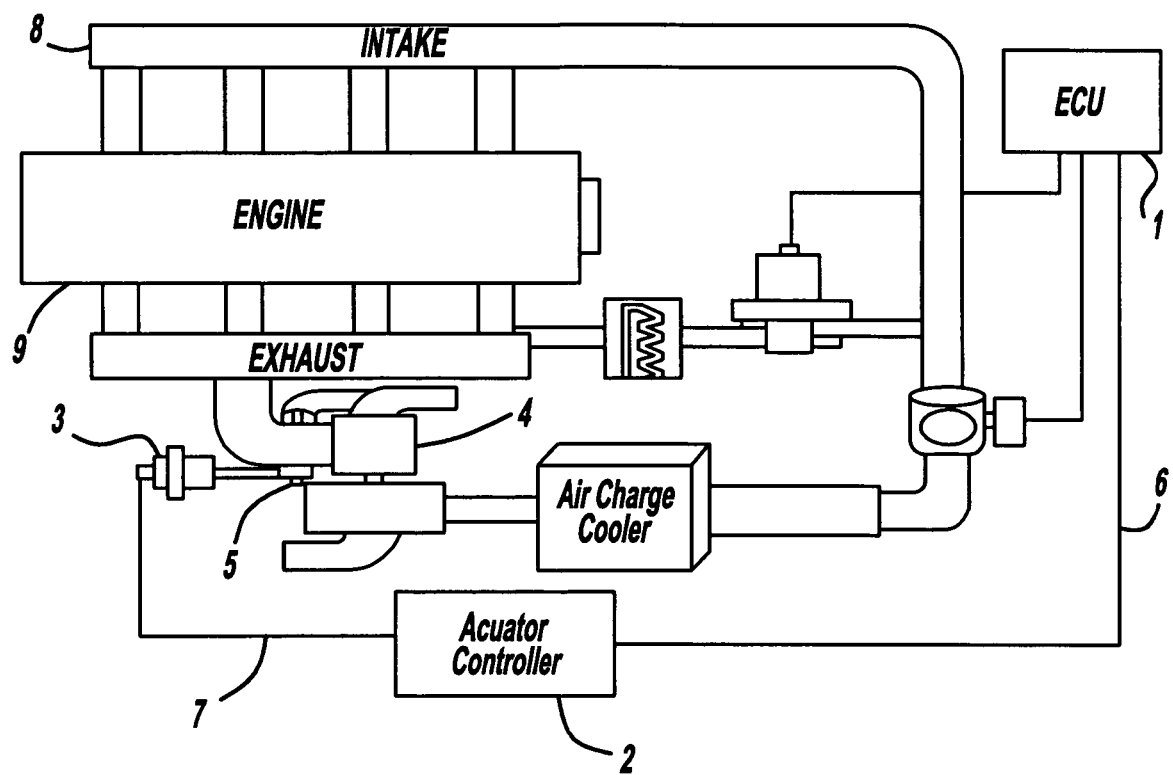
FIG. 1 shows a schematic of a system using a turbo charger and actuator to control boost pressure within the intake manifold of an engine.
Figure 2:
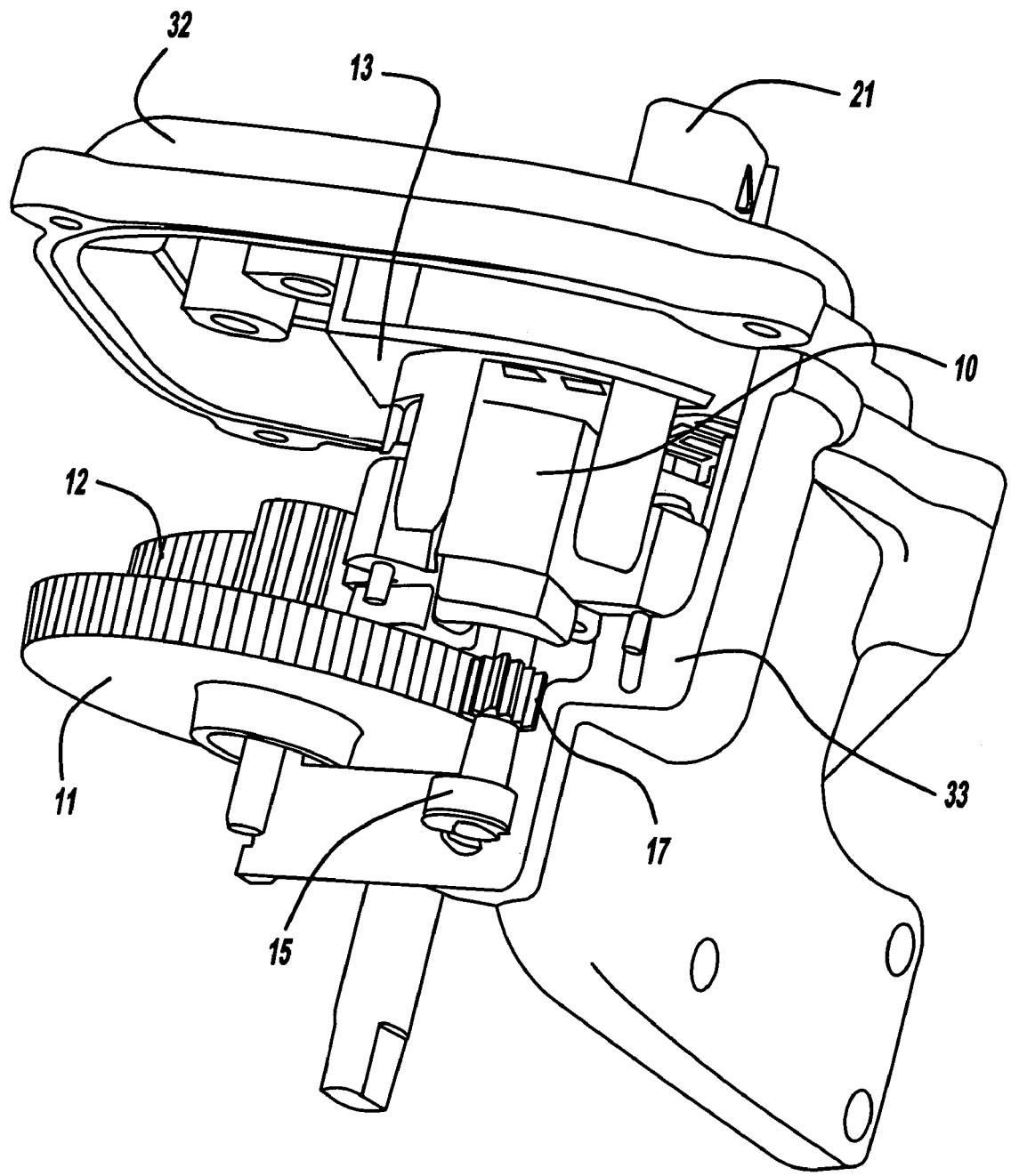
FIG. 2 shows a perspective view of the controller and interconnect arrangement with the housing partially removed and the cover attached.
Figure 3:
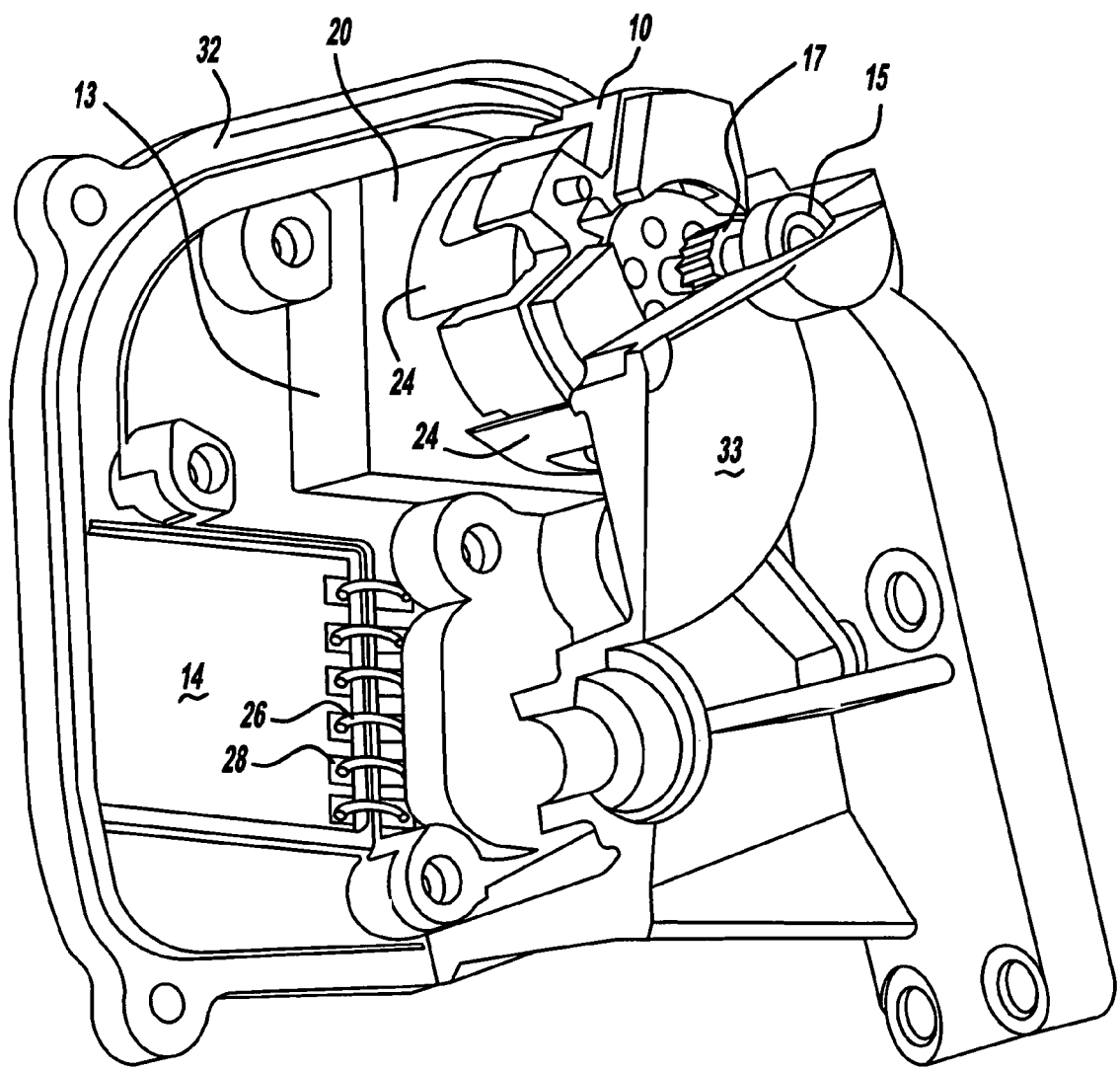
FIG. 3 shows another perspective view of the controller and interconnect arrangement with the housing partially removed and the cover attached.
Figure 4:
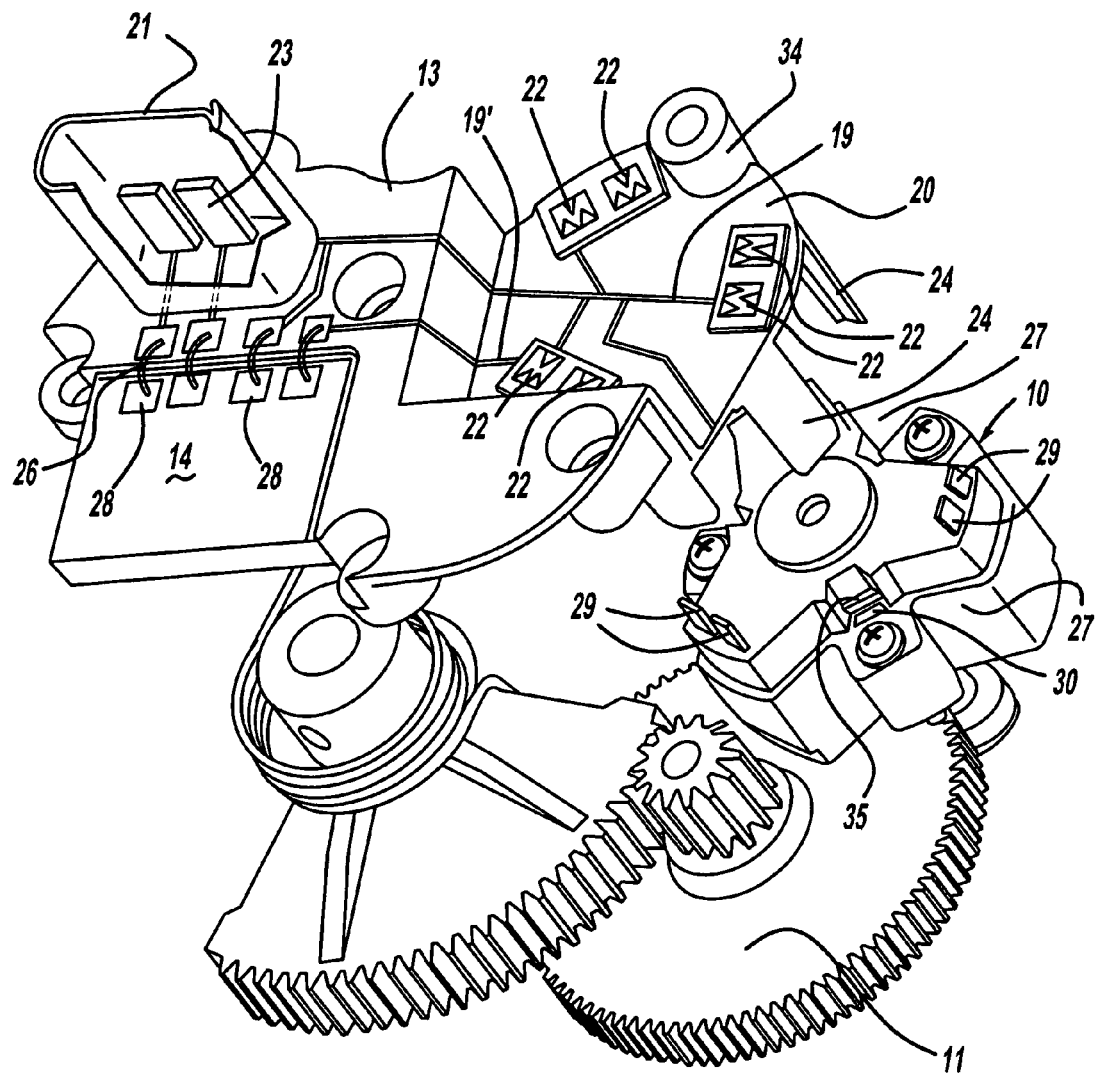
FIG. 4 shows a perspective view of the control and interconnect arrangement having the housing and cover removed and the motor disconnected from the arrangement.
Figure 5:
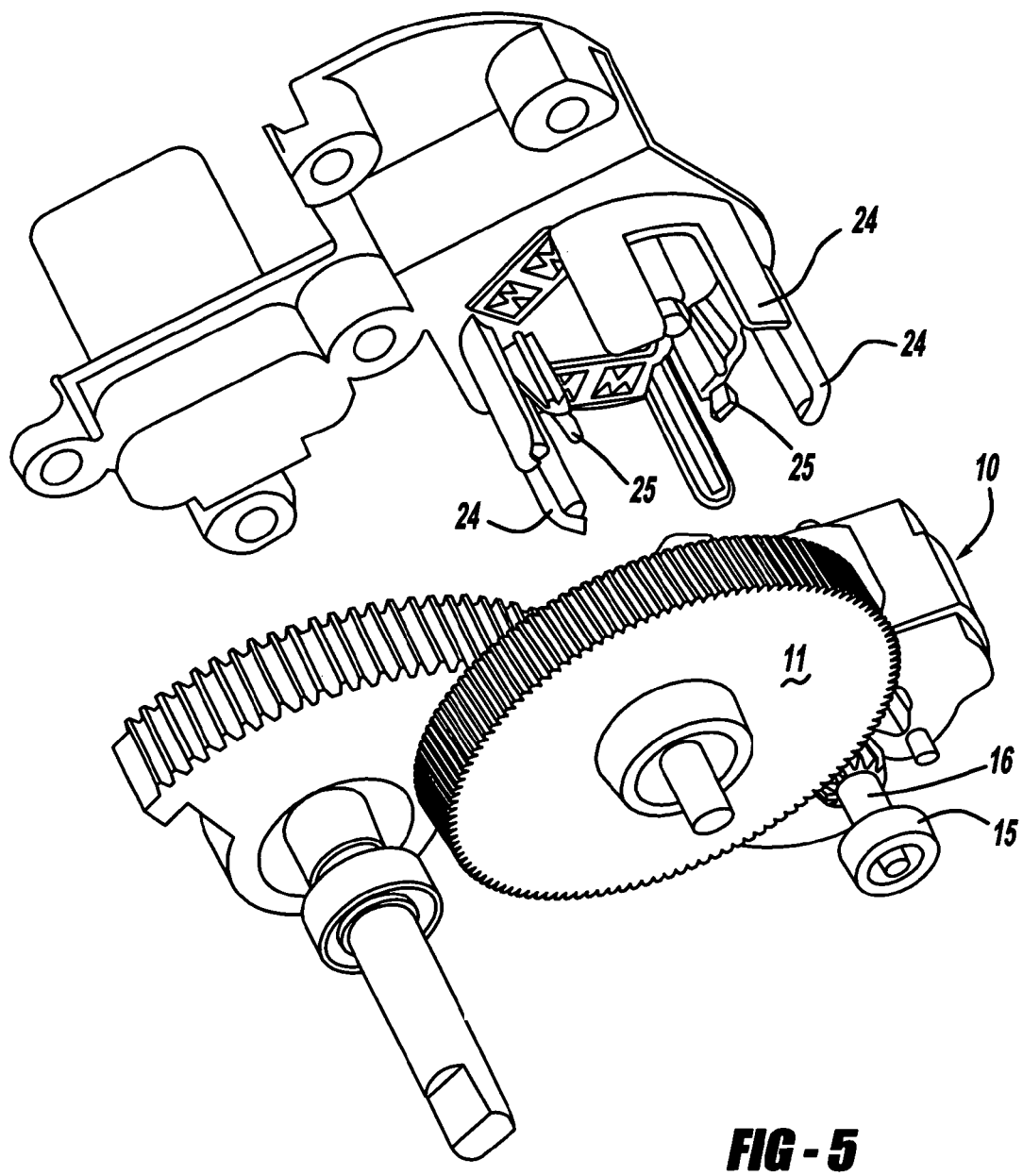
FIG. 5 shows another perspective view of the control and interconnect arrangement having the housing and cover removed and the motor disconnected from the arrangement.
Figure 6:
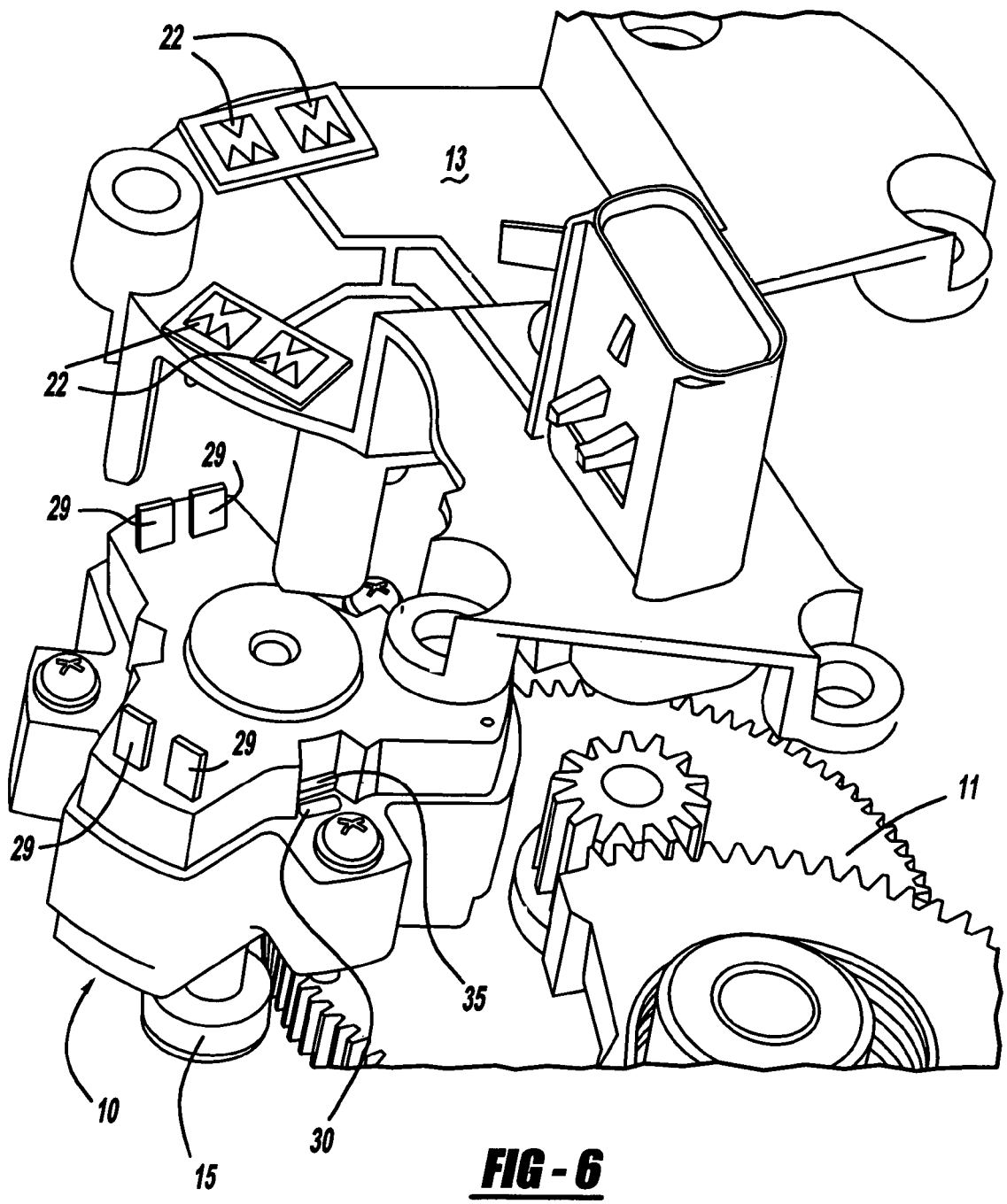
FIG. 6 shows a close up perspective view of the control and interconnect arrangement just prior to the motor being connected.
Figure 7:
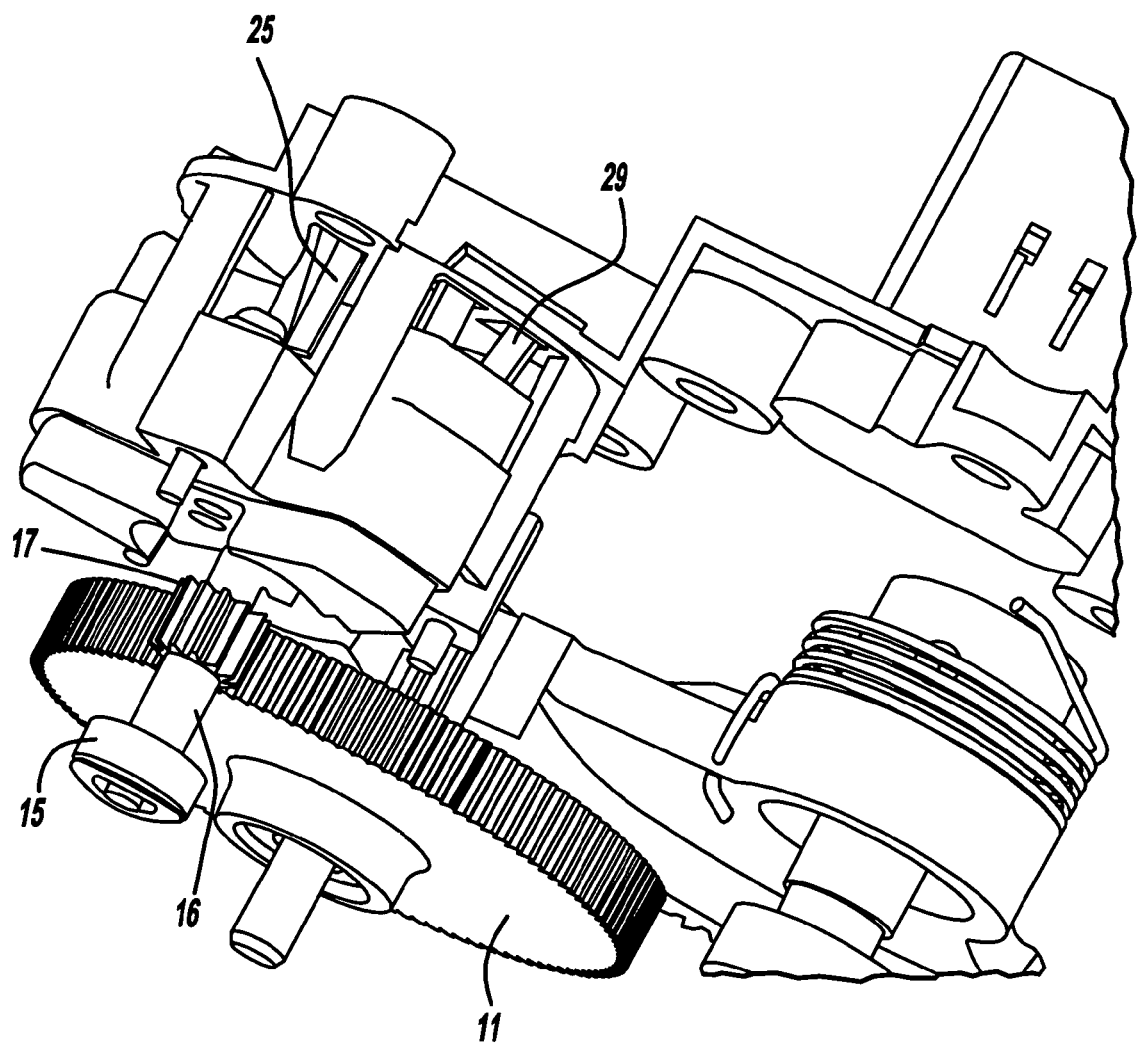
FIG. 7 shows a side perspective view of the control and interconnect arrangement with the motor connected.

The following description of the preferred embodiment(s) is merely exemplary in nature and is in no way intended to limit the invention, its application, or uses.

Referring now to FIGS. 2-7, various views of the present invention can be seen. The actuator or device 10 consists of a brushless D.C. motor, intermediate gear 11, and output gear/shaft 12 that are installed in a housing 33. Pinion gear 17 is pressed onto the motor shaft and engages intermediate gear 11. Bearing 15 is pressed to motor shaft 16 and is located in a counter bore in the housing.

Lead frame 13 and controller 14 are installed in a cover 32. The cover 32 and a housing 33 form two portions of a casting. The casting is a housing for an actuator such as a turbocharger. Controller 14 is an electronic circuit that will provide the necessary control for the device and communicate to an external system such as a vehicle ECU. Lead frame 13 consists of formed electrical conductors 19, 19', supported by a plastic form 20, HED sensors 25, integral connector 21 and wire bond pads 28. Integral connector 21 may be manufactured as part of plastic form 20 or connected as a separate component, to easily change the connector type for different applications. HED sensors 25 are attached to formed electrical conductors 19, 19' by suitable means such as welding or soldering. Slotted receptacles 22 are designed and formed to receive terminals 29, of the device 10, and make the electrical connection to the motor. A typical slotted receptacle 22 shown in the figures. This type is referred to as an "M" slot receptacle. Electrical conductor 19, 19' and plastic form 20 are also shown. The integral connector 21 has terminals 23 that will provide the electrical connection to an external system such as a vehicle ECU. The electrical conductors 19, 19' terminals 23, and bond pads 28 may be formed as a portion of electrical conductors 19, 19' or they may be made separately and connected by suitable means such as welding. The lead frame is secured to the cover by suitable means such as fasteners.

Controller 14 is fastened to the cover by suitable means such as thermal adhesive or screws. The cover is made of a material such as aluminum that has suitable mechanical strength and thermal characteristics for transference between the controller and cover. Other devices such as transistors, field effect transistors, and voltage regulators, that are part of the controller circuit, may be fastened to the cover to achieve thermal requirements. Controller 14 is electrically connected to lead frame 13 by a suitable means such as wire bond 26. Multiple wire bonds may be used depending upon the number of interconnections that are required. An alternate method for making the electrical connection between the lead frame 13 and controller 14 is the use of blade terminals and slotted receptacles similar to those described for making the motor-to-lead frame connection. Another method for making the connections is soldering.

During the assembly of the cover to the housing, locating features such as plastic guides 24 which project from the surface of the lead frame 13 can be aligned with recessed portions 27 on the device 10. Aligning the plastic guides 24 with the recessed portions 27 will align the motor terminals 29 with slotted receptacles 22 and HED sensors 25 with recesses 30 on the surface of the device 10. Connecting the terminals 29 with the slotted receptacles will make the electrical connection to the lead frame 13. Additionally sliding the HED sensors 25 into the recesses 30 will position the sensors 25 adjacent the motor rotor 35 so that the position of the device 10 can be sensed by the sensors 25. The sensors 25 sense the position of the permanent magnet or magnetic material in the motor rotor 35. The inclusion of the HED sensors on the lead frame has eliminated the need for a separate motor sensor circuit and interconnects. The HED sensors 25 can also be supported on the plastic guides 24. It is also possible for the HED sensors 25 to be a different type of sensor such as an induction sensor.

Figure 8:
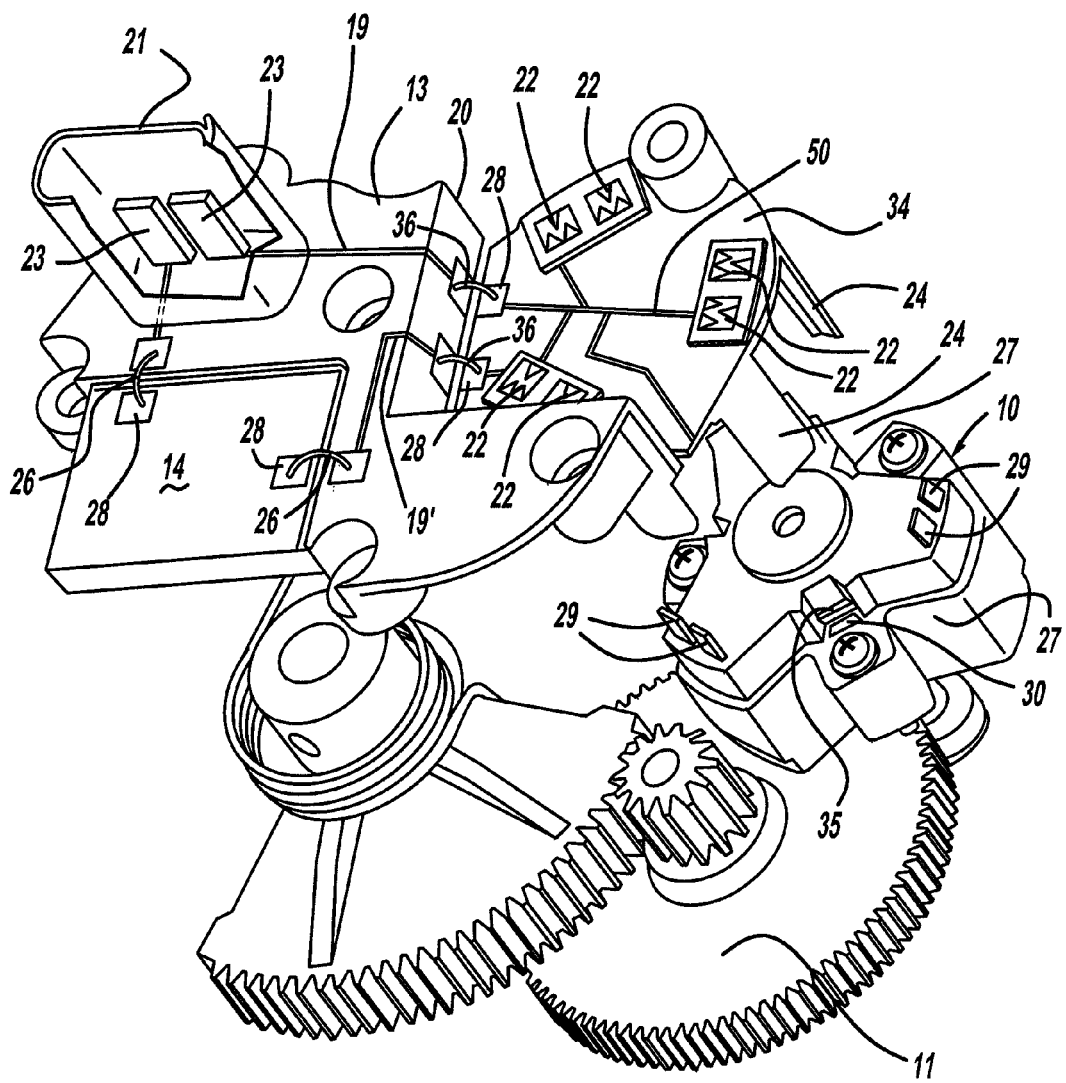
FIG. 8 shows an alternate embodiment of the invention depicting a perspective view of the control and interconnect arrangement having the housing cover removed and the motor circuit disconnected from the arrangement.

An alternate method for mounting the HED sensors is shown in FIG. 8. The HED sensors are mounted on a separate circuit 34. The circuit may be mounted separately or it may be mounted to the lead frame 13. Connections between the lead frame 20 and circuit 34, or between the control circuit and circuit 34, are made by a suitable means such as wire bonding or soldering 36 and bond pads 28. The soldering 36 and bond pads 28 connect the one or more electrical conductors 19, 19' of plastic form 20 with the electrical conductors 50 of the separate circuit 34. The slotted receptacle 22 can be formed or attached to the electrical conductors or they could also be separate components and mounted and connected to the separate circuit 34. The circuit is made from a material such as laminated fiberglass and epoxy. Mounting separate circuit 34 in the lead frame will eliminate the need of a multiple conductor cable or other method of connecting between the lead frame and circuit 34.

The device 10, or motor, may have 3 coils connected in a "Y" configuration. Three terminals, one from each coil, are connected together. The three terminals used for the "Y" connection do not require further connection to other components. The connection can be accomplished by interconnecting the three slotted receptacles in the lead frame. An alternative is to interconnect them on the D.C. motor. The later method will eliminate the need for 3 slotted receptacles in the lead frame.

The control system will operate in the following manner. The vehicles control system will provide an electrical signal to terminals 23 of integral connector 21. The signal is communicated to device controller 14 via electrical conductors 19, 19' in lead frame 20 and wire bonds 26 connected to bond pads 28. The device controller will deliver an electrical control signal, in similar manner, to the device 10, through the electrical connection of slotted receptacles 22 and terminals 29. The controller 14 can monitor device characteristics such as position, temperature, voltage, current, motor resistance, response time and the number of occurrences of overheating, or high voltage. The device will develop a torque that is transmitted to shaft 16, pinion gear 17, intermediate gear 11 and output gear/shaft 12. The shaft of device 10 will rotate to the desired position for controlling the turbocharger. The sense signal from the HED sensors 25 will be communicated to the controller 14, via electrical conductors 19, 19', in lead frame 20, to provide feedback for communicating and controlling the device.

The HED sensors 25 can also be used to provide position control for the device. An alternate method of position control is to use a different type of sensor for example an inductive type sensor would be a suitable alternative. In this alternate embodiment the sensor would be located on one of the rotating parts, such as the output gear/shaft 12. Other sensor components, such as the transmitter coil, receiving coil, and circuit could be located on the controller 14 or lead frame 13.

The drawings shown have identified the cover 32 and housing 33 it is within the scope of this invention for the control and interconnection system for use in a control apparatus to be applied to either cover or housing.

The present interconnection arrangement allows for a method of assembly of a lead frame to a device using a quick connect type of arrangement using blade type terminals and slotted receptacles (in the lead frame). It is within the scope of this invention for the interconnect arrangement to interchange the location of the blade type terminals and the slotted receptacles within the interconnect arrangement. For example, slotted receptacles can be used on the device that will receive a blade type terminal used on the lead frame. The plastic guides and recesses formed on the surface of the device ease the alignment of the device to the lead frame so that when the guides and recesses are aligned the electrical terminals and electrical conductors as well as the sensors and device will be aligned for connection.

The description of the invention is merely exemplary in nature and, thus, variations that do not depart from the gist of the invention are intended to be within the scope of the invention. Such variations are not to be regarded as a departure from the spirit and scope of the invention.

What is claimed is:
1. An electrical interconnection arrangement for an electrically controlled device comprising:
an electrically controlled device with one or more electrical terminals;
a plastic form with one or more electrical conductors embedded in said plastic form;

a separate circuit with one or more electrical conductors connected to at least one electrical receptacle, wherein said separate circuit is connectable to said electrically controlled device; and said electrical conductors of said plastic form are electrically connected to said electrical conductors of said separate circuit;

one or more sensors connectable to said one or more electrical conductors of said separate circuit, wherein said one or more sensors are located between said electrically controlled device and said electrical conductors of said separate circuit; and wherein said connection between said separate circuit and said electrically controlled device is a sliding connection provided between an electrical terminal of said electrically controlled device and said at least one electrical receptacle of said separate circuit while said characteristic of said electrically controlled device is sensed by said one or more sensors.

2. The interconnect arrangement of claim 1 wherein said one or more sensors engage said electrical device to sense said characteristic of said electrically controlled device.

3. The electrical interconnect arrangement of claim 1 further comprising:

one or more recesses formed on said electrically controlled device;

recesses formed on said electrically controlled device for guiding and aligning said plastic form, wherein said recesses facilitate the positioning of said sensors adjacent said electrically controlled device to allow sensing of said characteristic of said electrically controlled device.

4. The electrical interconnection arrangement of claim 3 wherein said one or more sensors are supported by one or more plastic guides extending from said separate circuits.

5. The electrical interconnection arrangement of claim 4 wherein alignment of said one or more recesses of said electrically controlled device are with said one or more guides causes alignment of said one or more electrical terminals and said one or more electrical conductors and alignment of said one or more recesses and said one or more sensors.

6. The electrical interconnection arrangement of claim 5 wherein said one or more sensors are hall effect sensors.

7. The electrical interconnection arrangement of claim 1 wherein said interconnection arrangement is part of a turbocharger.

8. The electrical interconnection arrangement of claim 1 wherein said electrically controlled device is one selected from the group comprising a brushless motor and a brush motor.

9. The electrical interconnection arrangement of claim 1 wherein said plastic form is connected to the interior surface of a cover.

10. The electrical interconnection arrangement of claim 1 wherein said one or more sensors are configured to monitor said electrically controlled device parameters comprising one or more of the following:

position, temperature, voltage, current, motor resistance and response time.

11. The electrical interconnection arrangement of claim 1 wherein said electrical terminal is located on said separate circuit and said at least one electrical receptacle is located on said electrically controlled device.

* * * * *

UNITED STATES PATENT AND TRADEMARK OFFICE
CERTIFICATE OF CORRECTION

PATENT NO. : 8,074,622 B2  
APPLICATION NO. : 11/335118  
DATED : December 13, 2011  
INVENTOR(S) : Robert T. Telep et al.

Page 1 of 1

It is certified that error appears in the above-identified patent and that said Letters Patent is hereby corrected as shown below:

Title Page, item (73), Assignee: "BorgWarner, Inc." should be --BorgWarner Inc.--.

Signed and Sealed this  
Thirtieth Day of July, 2013

Teresa Stanek Rea  
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,074,622 B2 | |
| APPLICATION NO. | : 11/335118 | |
| DATED | : December 13, 2011 | |
| INVENTOR(S) | : Robert J. Telep et al. | |

It is certified that error appears in the above-identified patent and that said Letters Patent is hereby corrected as shown below:

In the Specification

Column 2, Line 4, "hall" should be -- Hall --

Column 3, Lines 4-5, "receptacle 22 shown" should be -- receptacle 22 is shown --

Column 3, Line 55, "lead frame 20" should be -- lead frame 13 --

Column 4, Line 11, "vehicles" should be -- vehicle's --

Column 4, Line 14, "lead frame 20" should be -- lead frame 13 --

Column 4, Lines 26-27, "lead frame 20" should be -- lead frame 13 --

Column 4, Line 38, "33 it is within" should be -- 33 are within --

Column 4, Line 52, "34" should be -- 14 --

Column 6, Line 11, "hall" should be -- Hall --

Signed and Sealed this
Twenty-sixth Day of August, 2014

Michelle K. Lee
*Deputy Director of the United States Patent and Trademark Office*